United States Patent [19] [11] 4,143,995
Divisi [45] Mar. 13, 1979

[54] SINGLE DRIVE MOTOR DEVICE PARTICULARLY TO SUPPLY FLUID CONVEYANCE TANDEM LINE SYSTEMS

[75] Inventor: Gualtiero Divisi, Milan, Italy

[73] Assignee: Dropsa S.p.A., Italy

[21] Appl. No.: 798,096

[22] Filed: May 18, 1977

Related U.S. Application Data

[63] Continuation-in-part of Ser. No. 640,966, Dec. 15, 1975, abandoned.

[30] Foreign Application Priority Data

May 15, 1975 [IT] Italy .................. 23352 A/75

[51] Int. Cl.² .......... F04B 49/00; F04B 1/04; F16N 7/14
[52] U.S. Cl. .................. 417/3; 417/17; 417/38; 417/63; 417/315; 184/27 A
[58] Field of Search .............. 417/12, 3, 17, 26–28, 417/38, 44, 63, 315, 319, 442, 505; 184/27 A

[56] References Cited

U.S. PATENT DOCUMENTS

| 1,557,222 | 10/1925 | Warner | 417/319 |
|---|---|---|---|
| 1,814,154 | 7/1931 | Hartley | 417/319 |
| 1,946,559 | 2/1934 | Wieskopf | 417/319 |
| 2,528,764 | 11/1950 | Leonard | 417/315 |
| 2,561,786 | 7/1951 | Davis | 417/505 |
| 2,780,334 | 2/1957 | Simmons | 417/315 |
| 2,873,003 | 2/1959 | Meinelt | 184/27 A |
| 3,174,436 | 3/1965 | Wanner | 417/273 |
| 3,701,350 | 10/1972 | Guenther | 417/505 |

FOREIGN PATENT DOCUMENTS

| 153267 | 6/1932 | Switzerland | 184/27 A |
|---|---|---|---|
| 315695 | 1/1930 | United Kingdom | 184/27 A |
| 333533 | 8/1930 | United Kingdom | 184/27 A |

Primary Examiner—William L. Freeh
Attorney, Agent, or Firm—Steinberg & Blake

[57] ABSTRACT

A device is described and shown for supplying tandem line fluid systems, the device comprising pumping means driven by an electric motor and a slide valve for alternately supplying the pressure fluid to either of the two lines, wherein the pump slide valve is controlled by using as the above motor a reversibly rotating type of electric motor, transmitting torque in one direction for controlling through a one-way drive clutch the pump, and in the other direction the slide valve through a second one-way drive clutch transmitting the torque in the opposite direction.

7 Claims, 6 Drawing Figures

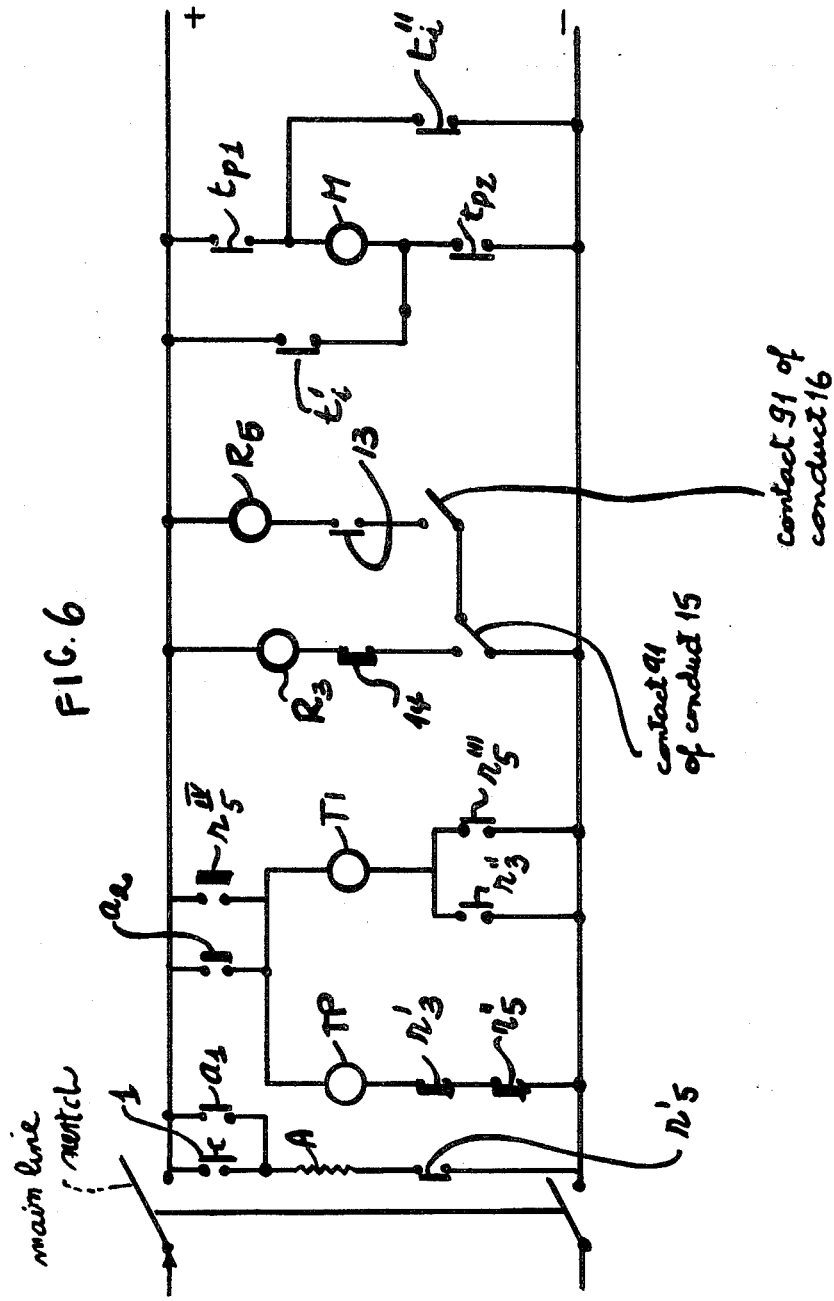

4,143,995

SINGLE DRIVE MOTOR DEVICE PARTICULARLY TO SUPPLY FLUID CONVEYANCE TANDEM LINE SYSTEMS

CROSS REFERENCE TO RELATED APPLICATION

The present application is a continuation-in-part of copending application Ser. No. 640,966, filed Dec. 15, 1975 now abandoned.

BACKGROUND OF THE INVENTION

The invention relates to a device for alternately supplying fluids to either line of a tandem line centralized distribution system.

Particularly but not exclusively referring to control tandem line lubricating systems, it it known that such systems comprise a lubricant (fluid) reservoir associated with a piston pump operated through a reduction gear by an electric motor. A lubricant supplied by the pump reaches a slide valve, also operated by a motor or other device, such as electromagnetic device, supplying either of the lines. The two lines supplied by the slide valve and along which the use locations, such as feeders, are distributed, terminate with electric contact members becoming effective when a desired pressure has been attained in the respective line. When one of the lines is at the maximum operating pressure, the electric motor driving the pump is stopped, whereas the motor or device controlling the slide valve is started. When the slide valve reaches the end of stroke position, the associated driving device is stopped by electric contact members also starting the pump motor and then the pump can supply fluid to the other line.

Conventional approaches have substantial disadvantages due to the provision of two electric motors or devices adding to the overall size of the equipment (pump plus reversing unit), and particular expedients would be required for providing the desired timing.

SUMMARY OF THE INVENTION

It is the main object of the present invention to provide a supply device for tandem line pressure fluid systems, free of the above mentioned disadvantages, and comprising an electric motor for driving the pump and a slide valve, the device being essentially characterized in that the control for the slide valve and pump is provided by using an electric motor of reversible rotational direction which, in one direction will control through a free-wheel the pump, and in the other direction the slide valve through a second free-wheel operating in opposite direction to the former.

BRIEF DESCRIPTION OF DRAWINGS

Further details and advantages of the invention will become more apparent from the following detailed description given by mere way of unrestrictive example of a preferred embodiment in connection with a central tandem line grease lubrication system, as shown in the accompanying drawings in which:

FIG. 6 is a control circuit.

DESCRIPTION OF PREFERRED EMBODIMENTS

Figure 1:
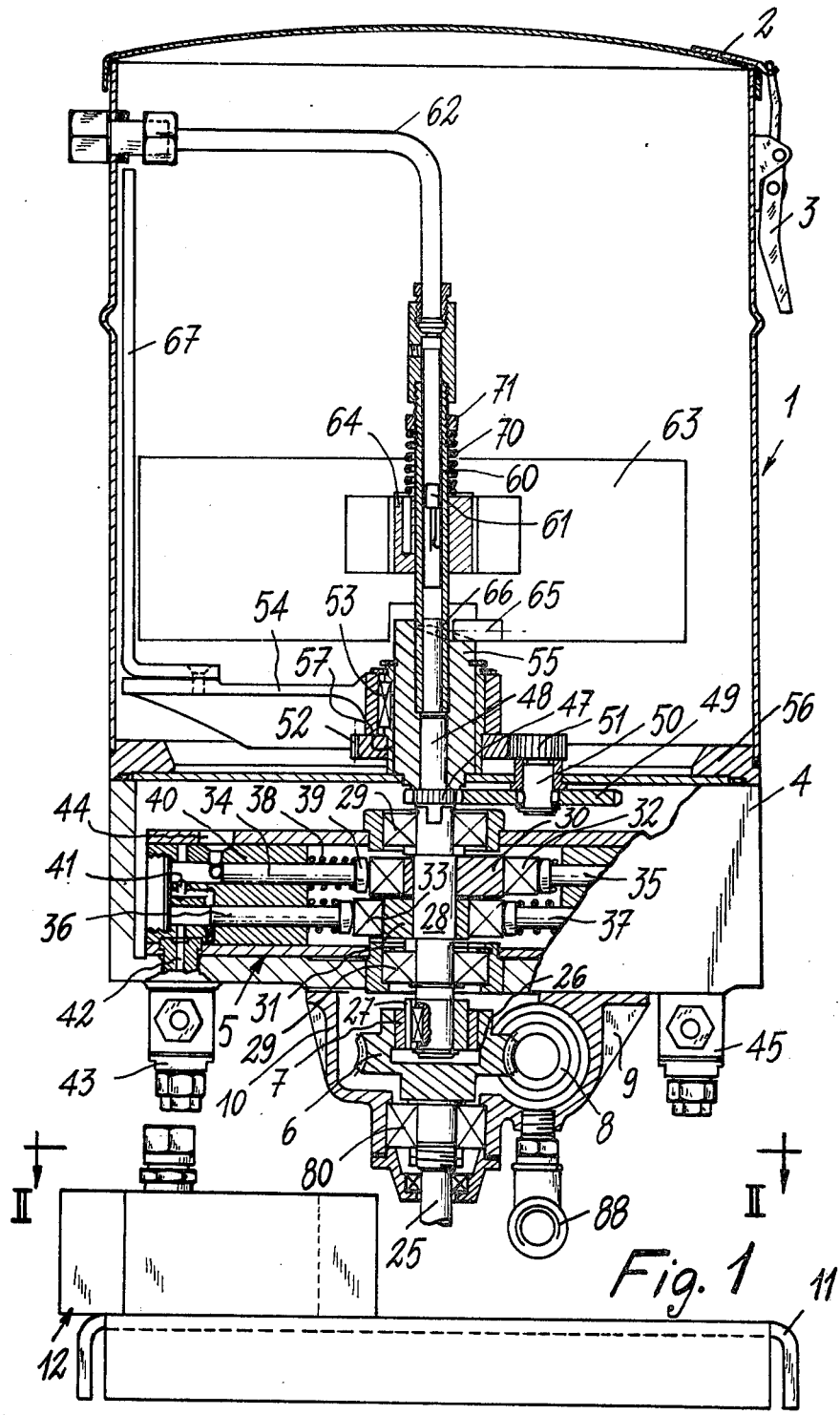
FIG. 1 is a vertical sectional view of the pump with some parts shown in front view, others in sectional view and still others omitted for the sake of clarity.

Referring to the drawings, reference numeral 1 designates as a whole the reservoir for the grease lubricant which can be charged at the top through a lide 2 lockable by means of a lever 3. At the bottom, said reservoir is connected in any known way to a body member 4, accommodating therein the piston unit, designated at 5 as a whole. This piston unit 5 is driven through a worm wheel 6 and a free-wheel or one-way drive clutch 7 by a worm 8 driven by a reversible motor, not shown on the drawing, but connected to a flange 9 forming part of the box member 10 attached at the bottom to said body member 4.

The foregoing can be supported in any known manner by a base plate 11 on which a slide valve 12 and two contactors or switches 13, 14 are arranged, angularly offset to one another. The two lubrication system lines, respectively designated at 15 and 16, are connected to holes or bores 17 and 18 in the casing of said slide valve 12. The slide valve is driven by a cam 19 and an arm or ring 20 with a fork termination at 21 enclosing the head 22 of valve member 23 of valve 12. The cam is rotated via a free-wheel or one-way drive clutch enabling a rotation in a direction opposite to the direction afforded by the above mentioned free-wheel 7.

Free-wheel or one-way drive clutch 24 is carried on a shaft 25 torsionally integral with worm wheel 6.

Particularly, worm 8 driven by the electric motor meshes with worm wheel 6 having a blind hole 26 in which free-wheel 7 is mounted. An adaptor ring 27 is mounted within said free-wheel and torsionally integral with a shaft 28 carried on bearings 29 forming part of pump unit 5. Two cams 30, 31 are keyed on shaft 28 and angularly offset to each other by about 140°. Bearings 32, 33 are keyed on said cams and have pistons 34, 35, 36 and 37 pressing thereagainst from opposite sides. This pressing or contact between the pistons and cams is assured by springs 38 acting on one side against the piston head 39 and on the other side against a shoulder 40 provided within body member 5 forming with its bores the piston cylinders. Thw two cylinders of pistons 34, 36 are interconnected through channels 41. The cylinder of piston 36 is connected through conduit 42 to a coupling 43, while the cylinder of piston 34 is connected through a suction conduit 44 with reservoir 1.

A similar arrangement, although not so clearly shown, is provided for pistons 35, 37 on the right side of FIG. 1. Coupling 45 is connected with coupling 43 and communicates with slide valve 12 at inlet 46. Coupling 45 is the delivery coupling for the two pistons 35, 37.

As it will be appreciated, one cam controls two diametrically opposite pistons.

Shaft 28 is torsionally integral with a gear wheel 47 carried on shaft 48. Gear wheel 47 meshes with a gear wheel 49 carried on a shaft 50 having a gear wheel 51 coupled thereto. This gear wheel 51 meshes with a gear wheel 52 which is torsionally integral through a key 53 with a doctor blade 54 acting to downward press the grease when rotated through the above shown kinematic means. Shaft 48 idly rotates within a hollow stud 55 which is secured to a perforated or interrupted plate 56 clamped between said reservoir 1 and body member 4.

Said hollow stud 55 has idly mounted thereon a grooved ring 57 for making said doctor blade 54 and gear wheel 52 integral through key 53.

A tube 60 is attached to hollow stud 55 and has mounted therein a per se known magnetic control contact, the wires or leads of which are outward brought through a tube 62.

A lug 63 is rotably carried on shaft 60 and has a magnet 64 secured thereto. This lug has a pin or pivot 65 bearing on an inclined surface 66 at the upper end of hollow stud 55.

An arm 67 is integral with doctor blade 54 and extends parallel to the axis of reservoir 1 which is cylindrical.

When reservoir 1 is empty, said pin or pivot 65 is urged to the bottommost position of the inclined surface 66 by a spring 70 acting between magnet 64 and a threaded ring 71 screwed on said hollow shaft 60.

Referring to FIG. 1, it will be seen that when the arm 67 rotates together with the doctor blade 54, it will generate a circular movement of the grease contained in the reservoir 1. The rotation of the grease causes the lug or body 63 to rotate in the same direction, and the pin 65 which is fixed to the lug 63 will as a result tend to move upwardly along the inclined surface 66 to remain at the upper end region of the stud 55 so that both the lug 63 and the magnet 64 remain at this time at an elevated position. This upward movement is opposed by the spring 71. The switch or reed contact 61 remains open at this time because it is located beyond the magnetic field of magnet 64.

When the rotation of the shaft 28 is stopped during those intervals when the position of the valve means is changed, the spring 70 is not capable of moving the lug or body 63 downwardly because of the thickness of the grease and because the duration of the interval during which the position of the valve is changed is too short to permit such downward movement.

However, when the grease content of the reservoir 1 is below a certain level, the force exerted by the rotating grease on the lug 63 is insufficient to prevent downward displacement of the lug 63 by the spring 70. This displacement will indeed cause the pin 65 to move down to the lower end of the inclined surface 66. Of course the magnet 64 also is displaced downwardly and now is capable of closing the switch 61 so that the warning lamp c shown in enclosure A will become illuminated. Of course, the circuit could be just the opposite and elements 61 and 64 could cooperate in a manner according to which element 64 normally maintains the switch 61 closed until the pin 65 reaches the bottom of the inclined surface 66 whereupon the switch 61 is no longer in the field of the magnet 64 and thus opens to bring about energizing of the lamp.

Worm wheel 6 is integral with shaft 25 carried by a bearing 80 provided in body member 10.

As above described, through free-wheel 24 shaft 25 can drive cam 19 which through ring 20 controls movable slide valve member 23. Cam 19 is integral with a base plate 81 having a finger 82 intended to act upon contactors or switches 13, 14.

Valve member 23 of slide valve 12 is a piston type of member having four collars or pistons 83, 84, 85, 86. The cylinder, wherein said member 23 slidably operates, has opening therein at suitably spaced locations the outlets 17, 18 of the two lubrication system lines, inlet 46 for the lubricating grease and the return conduits 86, 87, the first of which is connected to a coupling 88 opening into body member 10 beneath worm 8, while the other conduit 87 opens through a coupling, not shown, into body member 4.

The use locations, comprising per se known metering devices 90, are spaced along lines 15 and 16, and at the end of such lines per se known contractors or switches 91 are positioned which, as a predetermined pressure is achieved, close the contacts acting on the electric motor driving the pump, causing the reversal thereof.

Figure 2:
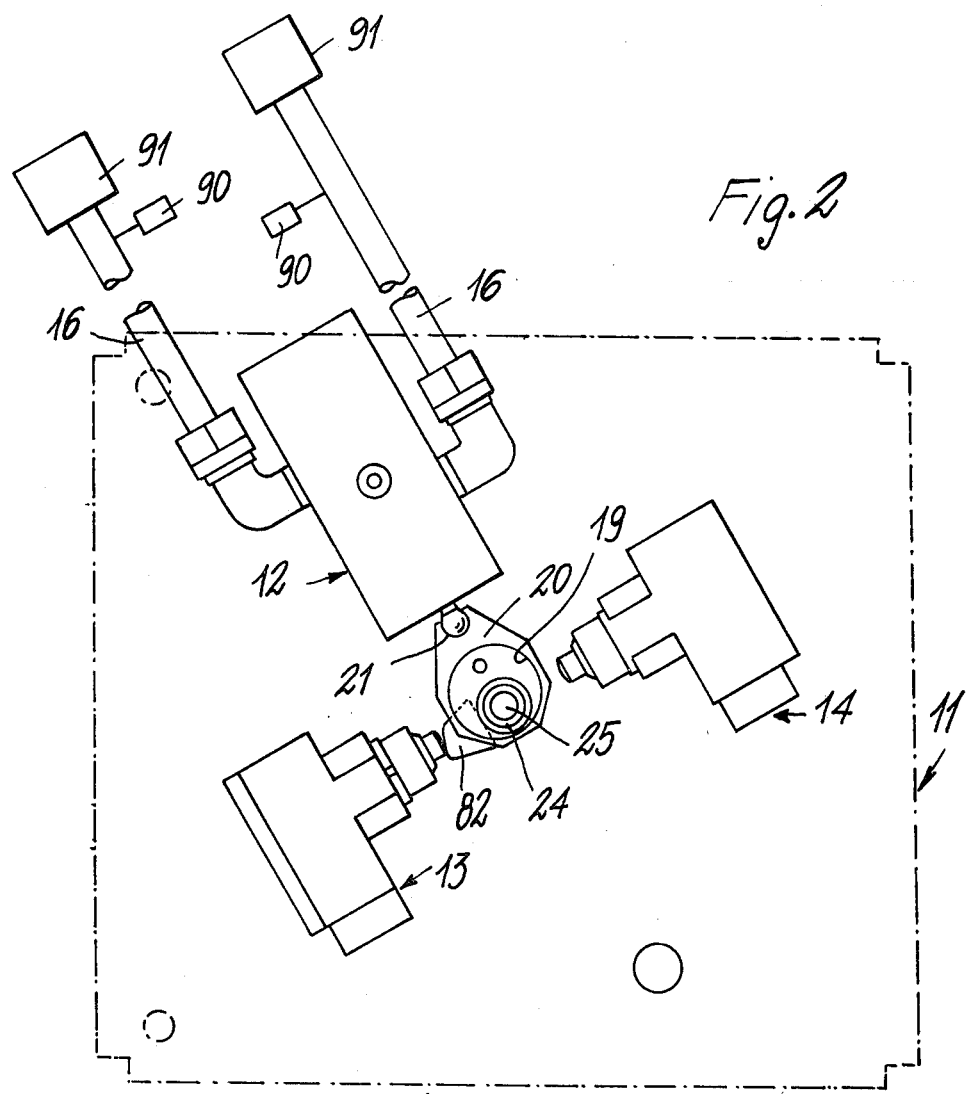
FIG. 2 is a plan view substantially corresponding to line II—II of FIG. 1.
Figure 3:
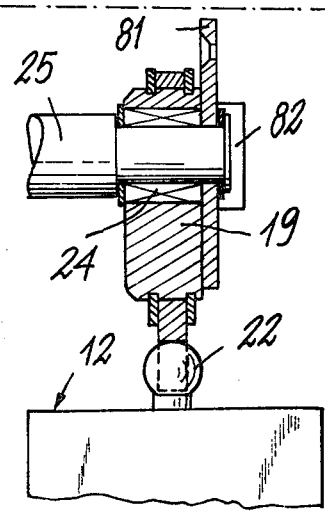
FIG. 3 shows a detail relating to the cam and free-wheel controlling the operation of the slide valve and end of stroke contacts.
Figure 4:
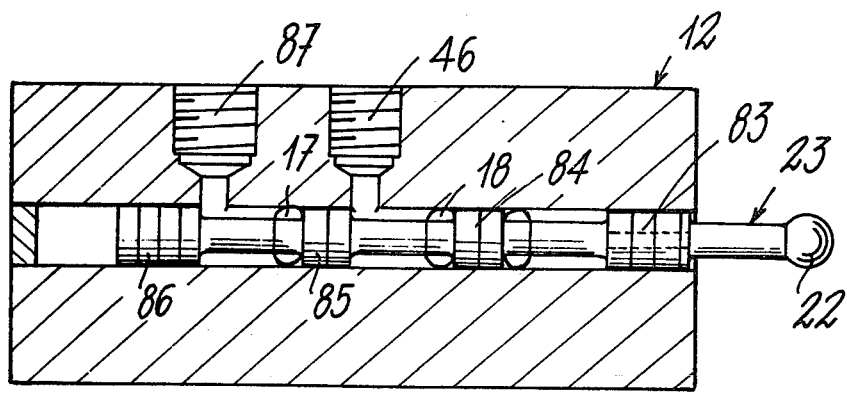
FIGS. 4 and 5 are two right angle sectional views of the slide valve.
Figure 5:
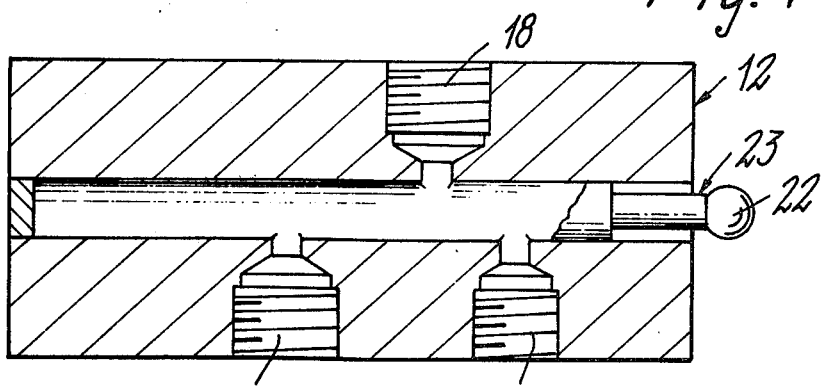

The foregoing operates as follows:

Assume that the motor rotates to operate shaft 28 through free-wheel 7, while, since the other free-wheel 24 can be operated only in case of reverse rotation of shaft 25 coaxial with shaft 28, not transmitting any torque to cam 19, so that valve member 23 remains at the position shown in FIG. 4. Rotation of shaft 28 causes a suction and compression movement of pistons 34, 35, 36, 37, so that pressure grease flows to inlet 46 and through port 18 arrives at line 16. When contactor 91 connected to line 16 detects the desired or calibration pressure, and accordingly the metering device 90 connected to line 16 has accomplished the function thereof, this contactor 91 connected to line 16 will control a circuit for reversal of the motor rotation direction. Therefore, shaft 28 is not rotated therewith, so that no grease is pumped to inlet 46 of slide valve 12. However, shaft 25 is reversely rotated and drvies cam 19 through free-wheel 24. This reversed movement displaces slide valve member 23 to the end of stroke position shown in FIGS. 2 and 5, thus establishing a connection between inlet 46 and outlet 17 associated with the other line 15 of the lubrication system. On reaching this end of stroke position, nib 82 acts upon contactor 13 reversing the direction of rotation for the motor, whereby shaft 28 is driven, as well as pumping unit 5, thus supplying grease to inlet 46.

When the end of line 15 has achieved the desired pressure, the associated contactor 91 is operated and causes the motor to rotate in a reverse direction, stopping grease supply and displacing the slide valve back to the position indicated in FIG. 4. Simultaneously with this return of the slide valve member 23 the cam 82 turns together with cam 19 so as to actuate switch 14 which again brings about a reversal in the direction of rotation of the drive motor so that now the pump will be operated to supply the lubricant through the pipe 16 as required. Thus, when valve means 12 is in the position of FIG. 4, cam 19 together with cam 82 has turned through 180° beyond the position thereof shown in FIG. 2 and the cam 82 cooperates with the switch 14, whereas when the parts are in the position shown in FIG. 2, the valve means 12 is in the position shown in FIG. 5.

With respect to the pressure-responsive switch means 91 and the position-detecting switch means 13 and 14, the pressure-responsive switch means or position-detecting switch means can reverse a motor by way of the circuitry illustrated in FIG. 6. Referring to FIG. 6, when the pushbutton 1 is depressed, the relay A is energized because contact $r'_5$ of relay R5 is closed. Relay A closes its contacts $a_1$ and $a_2$. Contact $a_1$ serves to maintain relay A energized. On closing contact $a_2$ relay TP is energized and its contacts $tp_1$ and $tp_2$ close. Contacts $r'_3$ and $r''_5$ being closed, the motor M (which drives the piston unit 5) rotates in the direction corresponding to the feeding or grease to one of the conduits 15, 16, for example 15.

When the pressure operated contact 91 of conduit 15 senses the predetermined pressure valve, it closes the branch of the circuit including relay $R_3$ and closed contact 14. The contact 14 is normally closed because the finger 82 is acting on contact 13 which is therefore open. The energized relay $R_3$ opens contact $r'_3$ thus deenergizing relay TP and stopping motor M, and closes contact $r''_3$ thus energizing relay TI. The contacts $t_i'$ and $t_i''$ close and motor M rotates in the opposite direction thus moving valve member 23 in the other end position in which piston unit 5 is connected with the conduit 16. Said inverted motion lasts until the finger 82 contacts switch 14. When said end position is reached the pressure in conduit 15 drops because said conduit is now connected to the return passage 87. Therefore, contact 91 of line 15 returns in the position shown on enclosure B. Relay $R_3$ is deenergized, its contact $r'_3$ closes, TP is energized and motor M is also energized to feed lubricant to conduit 16. When a predetermined pressure is reached at the end of conduit 16, its contact 91 closes the circuit branch where relay $R_5$ is located. Being finger 82 on contact 14, contact 13 is closed and thus relay $R_5$ is energized. Contact $r'_5$ and $r''_5$ open and contacts $r'''_5$ and $r^{IV}_5$ close. Relays A and TP are deenergized and relay TI energized. Thus motor M inverts its direction of motion causing valve member 23 to be moved in its other end position. When said end position is reached finger 82 opens contact 13 and operation is stopped until pushbutton 1 is depressed. The function of switch 14 is the same as that of switch 13.

As to piston operation, it should be noted that the cams driving such pistons are out of phase to each other by about 140°. On the left side of FIG. 1, piston 34 is arriving at the end of intake or suction stroke, followed by piston 36 with some delay or lag. Therefore, the grease enters the cylinder of the first piston. When the latter begins the compression phase, the second piston or piston 36 is at intake or suction phase having exposed the outlet of conduit 41. When piston 34 arrives at an end of its compression stroke, piston 36 shuts off the outlet of conduit 41, therefore ejecting grease to conduit 42. The same is true for the other pair of pistons 35, 36, but with a phase displacement of about 180°.

This approach enables the drive motor to positively operate in pumping throughout 360° rotation without those dead phases (during suction) occurring in conventional pumps.

It should also be noted that as shaft 28 rotates, lug 63 is displaced against the reaction of spring 70. Due to engagement of pin 65 with inclined surface 66, this restricted rotation of lug 63 causes the lug to be raised and accordingly magnet 64 to be moved relatively to magnetically operated contactor 61 while, in absence of grease, spring 70 downwardly moves lug 63 and magnet 64 as well. This relative movement causes opening or closing of contactor 61 with resulting lighting of a warning light, not shown, indicating, when turned on, the absence of grease in reservoir 1. Ring nut 71 is for adjusting the reaction of spring 70 in connection with consistency of the greases being used.

Thus, the worm 8 and the worm wheel 6 may be considered as a reversible drive means while the units 7 and 24 are a pair of one-way drive clutch means operatively connected with the reversible drive means in such a way that the clutch means 7 transmits the drive when the drive means rotates in one direction while the clutch means 24 transmits the drive when the drive rotates in the opposite direction. The clutch means 7 of course transmits the drive to the pump means 5 for delivering fluid under pressure to the slide valve means 12 which in one position transmits the fluid under pressure to the conduit means 15 and in the other position transmits the fluid under pressure to the conduit means 16. The units 91 form pressure-responsive switch means each of which will reverse the direction of rotation of the drive means 6, 8 when the pressure in the conduit means 15 or the conduit means 16 reaches a given value. Thus the clutch means 7 will now terminate the transmission of the drive and instead the clutch means 24 will transmit the drive. This clutch means 24 is operatively connected with the valve-operating means 19 to bring about a change in the position of the valve means 12 while the switch means 13, 14 detect when the valve means 12 has reached its changed position and in response thereto again reverse the direction of rotation at the drive means 6, 8 so as to again start the operation of the pump means 5 with the slide valve means 12 remaining in its changed position until the pressure in the other conduit means reaches a given value, whereupon the above cycle of operations is repeated.

The components 63, 65, 66, and 70 form a means for detecting when the supply of fluid to be pumped must be replenished, this detecting means actuating through the magnet 64 the switch 61 for energizing a warning light or the like.

Although only one embodiment of the invention relating to a grease system has been described, those skilled in the art can now readily devise many changes and modifications, all of which should however be intended as within the scope of the invention, such as for example the application of the device to other fluids.

What is claimed is:

1. In a system for delivering fluid under pressure, pump means for pumping the fluid, valve means communicating with said pump means for receiving fluid under pressure therefrom, said valve means having a pair of positions, a pair of conduit means communicating with said valve means for receiving fluid under pressure therefrom and for conveying the fluid under pressure to predetermined locations, said valve means in one of its positions delivering fluid under pressure to one of said conduit means and in the other of its positions delivering fluid under pressure to the other of said conduit means, valve-operating means operatively connected with said valve means for moving the latter between said positions thereof, reversible drive means for providing a drive in a pair of opposed directions, a pair of one-way drive clutch means both connected operatively with said reversible drive means to be operated thereby and respectively connected operatively with said pump means and said valve-operating means for transmitting a drive from said drive means to said pump means when said drive means operates in one direction and for transmitting a drive from said drive means to said valve-operating means when said drive means operates in an opposite direction, a pair of pressure-responsive means operatively connected with said pair of conduit means for detecting when the pressure of the fluid conveyed therethrough reaches a given value and for responding to reaching of said given value for reversing the driving direction of said drive means, and a pair of detecting means for detecting when said valve means has reached said positions thereof and for again reversing the driving direction of said drive means when the position of said valve means has been changed, whereby when said valve means is in one of its positions and said pump means is operated by said drive means through one of said clutch means fluid under pressure will be delivered to one of said conduit means to be conveyed therethrough until the pressure-responsive means operatively connected with said one conduit means detect that said given pressure has been reached whereupon the latter pressure-responsive means will reverse said drive means to terminate the operation of said pump means while bringing about operation of said valve-operating means through the other of said clutch means to change the position of said valve means until one of said detector means detects that the position of the valve means has been changed and again reverses said drive means to resume operation of said pump means with delivery of fluid under pressure through said valve means to the other of said conduit means until the pressure-responsive means connected to said other conduit means detects that the given pressure has been reached and reverses said drive means for again terminating the operation of said pump means while resuming operation of said valve-operating means to change the position of said valve means back to the first position thereof, the other detector means detecting when the latter first position of said valve means has been reached for terminating the operation of said valve-operating means and again resuming the operation of said pump means.

2. The combination of claim 1 and wherein said pump means includes a pair of coaxial rotary cams which are out of phase with each other, a pair of diametrically opposed pistons cooperating with each of said cams, and a plurality of cylinders respectively receiving said pistons, so that one pair of cylinders are situated on one side and another pair of cylinders are situated on the other side of said cams, each pair of cylinders being formed with a passage means and supply means communicating with the passage means of each pair of cylinders for delivering fluid thereto to be pumped by the pistons in each pair of cylinders, said valve means having an inlet communicating with both pairs of cylinders for receiving fluid under pressure therefrom.

3. The combination of claim 1 and wherein said valve means is a slide valve means having a slide valve member which is axially moved by said valve-operating means to provide said valve means with said positions thereof, said valve-operating means having a cam which operates first one and then the other of said detector means.

4. The combination of claim 3 and wherein said valve-operating means includes a rotary eccentric, a ring slidably surrounding said eccentric and operatively connected with said slide-valve member, and said cam which operates said pair of detector means being operatively connected with said rotary eccentric to rotate therewith.

5. The combination of claim 1 and wherein a supply means communicates with said pump means for supplying fluid thereto, and doctor means situated in said supply means and operatively connected to said drive means to be driven thereby simultaneously with said pump means for contributing to the supply of fluid to said pump means.

6. The combination of claim 1 and wherein a supply means communicates with said pump means for supplying fluid thereto, and detector means in said supply means for detecting when the supply of fluid should be replenished, and warning means actuated by the latter detector means for indicating that the supply of fluid should be replenished.

7. The combination of claim 6 and wherein the detector means in said supply means includes an inclined surface, a body movable along said inclined surface in response to lessening of the supply of fluid in said supply means, said warning means including a switch responsive to magnetic actuation and a magnet carried by said body and operating said switch when said body reaches a given position along said inclined surface.

* * * * *